United States Patent Office 2,998,416
Patented Aug. 29, 1961

2,998,416
YLIDE-TRANSITION METAL COMPOUND CATALYST SYSTEM, PROCESS OF MAKING AND METHOD OF USING
Arthur Mendel, White Bear Lake, Minn., assignor to Cities Service Research and Development Company, New York, N.Y., a corporation of New Jersey
No Drawing. Filed June 23, 1960, Ser. No. 38,138
34 Claims. (Cl. 260—93.7)

This invention relates to the polymerization of olefins. One aspect relates to a novel polymerization catalyst and the preparation thereof. Another aspect relates to a method of polymerization employing the catalyst.

Reactions for polymerizing olefins are well known in the art and are generally carried out in the presence of catalysts. One class of catalysts which has been used extensively in the polymerization of monoolefins, such as ethylene or propylene, is the "Ziegler-type." The Ziegler catalysts are the result of the reaction of two different species of metal compounds. One of these species is a higher valence transition metal compound and the other is a compound such as a metal alkyl. This species of catalyst has been successful in producing various high density alpha olefin polymers.

A number of hypotheses and observations appear in the prior art as to factors affecting the macromolecular structure of polymers and their physical properties. It is presumed by Natta [Modern Plastics, 34, 169 (1956)] among others, that the transition metal compound is reduced from a higher-valent state to lower-valent state during the formation of the catalyst system. Investigators have found that the use of a lower valent transition metal compound in the initial formation of the catalyst system will produce a higher yield of crystalline, or isotactic, polymer. The use of the tetrahalides and particularly the tetrachloride of titanium in the initial catalyst preparation results in high yields of amorphous, or nonisotactic, polymer. The Ziegler catalysts, when used in solution or in the liquid state, as opposed to a solid, crystalline catalyst suspended in liquid, tend to yield polymers with a high amorphous content. Since titanium tetrachloride is a liquid, the valence of the transition metal compound may be related to the physical state of the catalyst and to the tactic form of polymer produced. The catalyst system comprising titanium tetrachloride and tributylaluminum yields a polymer of about 70 percent amorphous content. Although an increase in the polymerization temperature, within limits, has the effect of producing a polymer of higher crystalline content, this increase in crystalline content appears to be due to the fact that the higher temperatures also yield a polymer of lower molecular weight and the lower molecular weight polymers show a comparatively greater tendency to crystallize. The results in polymerizations conducted with the catalyst of the present invention are at variance with some of the prior art results, as will be explained in greater detail below. The present invention is not necessarily limited to the theories or hypothesis discussed herein, including those of Natta or other investigators, such theories and hypotheses being offered as possible explanations of some of the principles involved.

It is an object of this invention, therefore, to provide an improved process for the initiation of organic reactions including the production of polymers.

It is another object of this invention to provide a process for the preparation of high molecular weight polymers, including high crystalline content polymers.

It is a further object to provide a process of producing a high molecular weight, crystalline polymers at low temperatures.

A further object is to provide a novel catalyst for initiating chemical reactions, including the polymerization of unsaturated organic compounds.

It is a still further object to provide a method for producing the new catalyst.

Other and further objects and advantages of the invention will become apparent to one skilled in the art upon referring to the accompanying disclosure.

It has been discovered that polymers may be produced by subjecting unsaturated monomers to the influence of a catalyst composition comprising the interaction product of (1) a transition metal compound, and (2) an ylide compound. A specific aspect of the invention is in the discovery that polymers having a higher crystalline content may be produced at relatively low temperatures using such monomers and catalysts.

For the purpose of this invention, an ylide compound is a pentavalent phosphorous compound for which two limiting resonance forms can be drawn. One form contains a carbon to phosphorous double bond

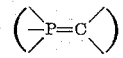

and the second contains a formal charged form at the same site

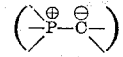

For convenience in nomenclature, the term "ylide" includes both resonance forms, in this application. When the phosphine methylenes were first discovered, they seemed to behave, in some respects, in a manner similar to typical organic compounds, but in other respects their behavior was somewhat similar to compounds containing ionic groups such as salts. In order to describe both properties in the name, the "yl" was taken to represent the organic function (e.g., alkyl) and compounded with the "ide," from the salt (e.g., halide) to form "ylide." Although some investigators have called this class of compounds "ylenes," the American literature seems to prefer "ylide" and for the purposes of nomenclature in this application, the latter has been adopted.

The ylides of this invention have the following generic structure:

wherein $R^1$, $R^2$, and $R^3$ may be the same or different and are organic radicals such as hydrocarbon and substituted hydrocarbon radicals preferably selected from the group of radicals consisting of normal or branched chain alkyl, halogenated alkyl, hydroxyalkyl, alkoxyalkyl, aroxyalkyl, aralkyl, aryl, alkaryl, halogenated aryl, hydroxyaryl, aroxyaryl, alkoxyaryl, and cyloalkyl radicals substituted with halogen, hydroxy, alkoxy, aryloxy, aryl, or alkyl groups; and $R^4$ is selected from hydrocarbon and substituted hydrocarbon radicals such that a single carbon atom is attached to the phosphorous atom by a double bond, the radicals including hindered and unhindered groups preferably comprising alkylidene, alkenylidene, cycloalkylidene, cycloalkenylidene, and the substitution products thereof including aryl, halogen, aryloxy, and alkoxy substituents. A hindered or sterically hindered compound is one having a bulky, large, or branched chain radical, for example which may affect the reactivity of closely located atoms in the compound. When the catalyst is used for forming higher polymers of olefins such as ethylene, $R^1$, $R^2$, and $R^3$ should not comprise hydroxy, amino, or carboxy groups. "Aryl" includes plural ring radicals including biphenyl and fused ring radicals such as naphthyl. Although many other ylide compounds have been prepared and reported, and are useful for some aspects of this invention, the class of ylide compounds described above represent the preferred embodiment of this invention.

The preparation of the ylide compounds is described for example by Schollkopf in Angewandte Chemie 71, 260–273 (1959). Generally the preparation comprises treating a triorganophosphine compound with an organic halide to give the respective phosphonium halide, which in turn is treated with a reagent such as phenyl lithium or sodium carbonate to remove the halogen acid and thus produce the ylide. The reaction given below illustrates this type of reaction.

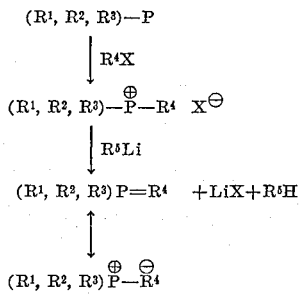

As a starting material any of the following phosphines may be used either alone or in combinations of two or more, to prepare the ylide.

Trimethylphosphine
Tris(chloromethyl)phosphine
Triethylphosphine
Tris(hydroxyethyl)phosphine
Tripropylphosphine
Tris(2-hydroxypropyl)phosphine
Triallylphosphine
Triisopropylphosphine
Tributylphosphine
Triisobutylphosphine
Tris(methallyl)phosphine
Triamylphosphine
Tris(1-methylpropyl)phosphine
Tris(2-methylbutyl)phosphine
Trisisoamylphosphine
Trihexylphosphine
Triheptylphosphine
Trioctylphosphine
Tribenzylphosphine
Triphenylphosphine
Tris-o-chlorphenylphosphine
Tris-m-chlorphenylphosphine
Tris-p-chlorphenylphosphine
Tri-o-methoxyphenylphosphine
Tri-m-methoxyphenylphosphine
Tri-p-methoxyphenylphosphine
Tri-p-phenoxyphenylphosphine
Tri-o-tolylphosphine
Tri-m-tolylphosphine
Tri-p-tolylphosphine
Tri-2,4-xylylphosphine
Tri-2,5-xylylphosphine
Tri-2,4-5-trimethylphenylphosphine
Tri-2,4-6-trimethylphenylphosphine
Tris(triphenylmethylphosphine
Tri-1-naphthylphosphine
Tri-2-naphthylphosphine
Tri-2-biphenylphosphine
Tri-4-biphenylphosphine
Ethyldimethylphosphine
Benzyldimethylphosphine
Phenyldimethylphosphine
4-methoxyphenyldimethylphosphine
4-bromophenyldimethylphosphine
4-phenoxyphenyldimethylphosphine
4-tolyldimethylphosphine
4-benzylphenyldimethylphosphine
4-(2-phenylethyl)phenyldimethylphosphine 2,5-xylyldimethylphosphine
2,4,6-trimethylphenyldimethylphosphine
Methyldiethylphosphine
Propyldiethylphosphine
Benzyldiethylphosphine
Phenyldiethylphosphine
4-hydroxyphenyldiethylphosphine
4-ethoxyphenyldiethylphosphine
1-naphthyldiethylphosphine
2-thienyldiethylphosphine
Phenylbis(ethoxycarbonyl)phosphine
Phenylbis(p-carboxyphenyl)phosphine
Phenyldiallylphosphine
4-bromophenyldiallylphosphine
4-isopropylphenyldiallylphosphine
Phenyldimethallylphosphine
Phenyldiisohexylphosphine
Ethyldiohenylphosphine
Ethoxycarbonyldiphenylphosphine
Phenylcyclotetramethylenephosphine
Phenylcyclopentamethylenephosphine
Phenyl-14-oxaphosphorin
Ethylisopropylisobutylphosphine
Ethylphenylbenzylphosphine
Ethylphenyl-4-methoxyphenylphosphine As may be seen, the organic radicals in the phosphines are substituted and unsubstituted hydrocarbon radicals limited in effect only in that they must not be reactive with the organohalide to such an extent that the ylide-forming reaction is interfered with. The ylides are not a part of the invention, and if the ylide is capable of existence, it may be interacted with the transition metal compound according to the invention. As indicated elsewhere herein, particular ylides are preferred where the intended use of the complex involves certain reactions.

The organic halide which is used in preparing the ylide will control the $R^4$ substituent of the formula

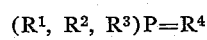

Although a monohalide will give a monofunctional ylide as illustrated above, the use of the dihalides to produce a difunctional ylide such as

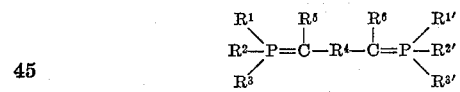

is also within the scope of this invention. Examples of organic halides suitable for the preparation of the intermediate phosphonium compounds are:

Methyl chloride
Methyl bromide
Ethyl chloride
Ethyl iodide
Isopropyl chloride
Butyl iodide
Vinylidene fluoride
1,2-dibromoethane
1,3-dibromopropane
1,4-diiodobutane
1,5-dichloropentane
Chlorocyclohexane
1-bromocyclohex-3-ene
1,3-dibromocyclohexane
Cyclopentyl chloride
2-chloro-4-methyl octane
1-chloro-3-phenyl propane
Chloro diphenyl methane
2-bromo-3,3 diphenyl butane
1-iodo-2,2,2-triphenyl ethane
1-chloro-2 butene
1-bromo-4,4-diphenyl-2-butene
1,4 dichloro-2-butene
1,3-di[bromomethyl]benzene
Diphenyl methyl chloride
Methoxy methyl chloride 2-ethoxy ethylene-1-chloride
1-bromo-2-chloroethane
1-chloro-3-methoxy-cyclohexane
5-ethoxy-1 chlorocyclohept(3)ene
1-tris(o-chlorophenyl)ethyl-2-chloride Other primary and secondary organohalides are useful in place of those mentioned above. In selecting an organohalide, consideration is given to the nature of the phosphine which is used so as to avoid detrimental side reactions.

The reagent which is used to remove the halogen acid from the phosphonium compound is not critical. Although butyl lithium and phenyl lithium have been extensively used, and are well suited for preparing many ylides, such organolithium compounds behave similarly to the Grignard reagents and are not suitable for preparing ylide compounds which contain an active hydrogen atom, such as alcohol or amine substituents, since the organo lithium compound reacts with the active hydrogen. If it is desired to prepare an ylide compound containing an active hydrogen atom, sodium carbonate, sodium ethoxide, or any other alkaline reacting material may be used to remove the halogen acid. However, such an active hydrogen containing ylide must be isolated or prepared in a non-hydrogen active solvent prior to the interaction with the transition metal compound for use as a catalyst.

The transition metal which is used in the form of a compound in this invention is preferably selected from the group of scandium, titanium, vanadium, chromium, manganese, iron, cobalt, nickel, yttrium, zirconium, niobium, thorium, selenium, tellurium, molybdenum, technetium, ruthenium, rhodium, palladium, lanthanum, lutetium, hafnium, tantalum, wolfram, rhenium, osmium, iridium, uranium, platinum, and actinium. These metals are employed in compound form as the halides, including the subhalides, oxyhalides, complex halides, chelates such as chlorocyclopentadienyl compounds and acetylacetonates, or chelates of other beta ketones, esters including alcoholates, organic acid salts such as acetates and benzoates, and oxides. The halides of titanium and vanadium have been found to be particularly effective. Examples of some of the preferred transition metal compounds which are particularly effective are $TiCl_4$, $TiCl_3$, $TiCl_2$, $TiI_4$, $TiBr_4$, $VCl_4$, $VCl_3$, $VOCl_3$, $VOF_3$, $VOCl_5$, $TiCl_2 (C_5—H_5)_2$, vanadium acetyl acetonate $[V(C_4H_8O_2)_4]$, $Ti(OC_4H_9)_4$, and $Ti(OC_6H_5)_4$ Transition metals and compounds other than those enumerated above are useful in this invention. The group IV–VIII transition metals are preferred, and in particular, titanium and vanadium.

Examples of other transition metal compounds which are suitable for use with this invention are:

$ScBr_3$, $ScCl_3$, $Sc_2O_3$
$CrCl_3$, $CrF_3$, $CrO_2Cl_2$
$MnBr_2$, $MnCl_4$, $MnSiF_6$
$FeCl_2$, $FeCl_2$; $2FeCl_3$, $FePtCl_6$
$CoCl_3$, $Co_2O_3$, $CoSnCl_6$
$NiCl_2$, $NiI_2$, $NiPtCl_6$
$YBr_3$, $YF_3$
$ZrB_4$, $ZrOCl_2$
$CbCl_5$, $CbOBr_3$
$ThF_4$, $Th_2O_7$
$SeBr_4$, $SeBrCl_3$, $SeOCl_2$
$TeBr_2$, $TeBr_4$, $TeI_4$
$MoCl_3$, $MoCl_4$, $MoCl_2$, $MoO_2Cl_2$, $MoCl_5$
$TcO$
$RuCl_2$, $RuCl_3$, $RuCl_4$
$RhCl_3$, $RhO$, $RhO_2$
$PdF_2$, $PdCl_2$, $PdBr_2$
$LaBr_3$, $La_2O_3$
$LuCl_3$
$HfO_2$
$TaCl_5$, $TaF_5$, $Ta_2O_4$
$WBr_2$, $WBr_5$, $WO_2Br_2$
$ReO_4$
$OsCl_2$, $OsCl_3$, $OsCl_4$
$IrBr_3$, $IrBr_4$, $IrO_3$
$UCl_3$, $UCl_4$, $UCl_5$, $UO_3$
$PtCl_4$, $PtCl_2$, $PtO_2$
$AcCl_3$, and $Ac_2O_3$ The following examples serve to illustrate a preferred method of preparing representative catalysts of this invention and as specific examples of a use for the catalyst, the polymerization of olefins. It is understood that these examples are set forth merely for illustrative purposes and that other catalysts and methods of preparing them, catalystic reactions, and methods of polymerization are within the scope of this invention. All of the catalysts were prepared in an atmosphere of purified argon. Polymerizations were conducted in Parr pressure bottles in a Parr low pressure apparatus.

EXAMPLE I

A solution of 7.89 grams (0.30 mole) of triphenylphosphine, which had been dried over silica gel, in approximately 100 milliliters of purified benzene, was placed in the Parr pressure bottle. The solution was flushed with purified argon for about 30 minutes. A Teflon-coated stirring bar and 1.87 milliliters (0.030 mole) of freshly distilled methyl iodide were placed in the bottle. The mixture was stirred magnetically for about 30 minutes at a temperature of 20–35° C. during which time, the white insoluble triphenylmethylphosphonium iodide formed. Fifty milliliters (0.030 mole) of a solution of n-butyl-lithium in benzene was then added by means of a syringe. The mixture immediately developed a light orange-yellow color. After stirring under argon for 1½ hours, 1.34 milliliters (0.0122 mole) of titanium tetrachloride were added. This made the mole ratio of ylide compound to transition metal compound 2.45. The mixture became light brown with a finely divided flocculent precipitate and the reaction appeared to be somewhat exothermic.

The bottle was then pressurized to 50 pounds per square inch with ethylene and agitated for 3 hours. The mixture was vented to remove the unreacted gases and diluted with methanol and stirred overnight. The polymer was collected by filtration, resuspended in methanol, and stirred. The procedure was repeated until the methanol washings were nearly colorless. The polymer was collected by filtration and dried in a vacuum desiccator, to give 1.21 grams of brittle white polyethylene which melted at about 172° to 174° C. A remelt, of the cooled polymer, melted at about 129° to 131° C. The initial higher melting point indicates that a high molecular weight polyethylene was obtained. The infrared crystallinity ratio of this polymer was 1.04.

EXAMPLE II

A solution of 8.6 grams (0.0328 mole) of triphenylphosphine in 150 milliliters of purified hexane were added to the Parr pressure bottle. To this solution, 1.98 milliliters (0.0328 mole) of freshly distilled methyl idide were added. The mixture was stirred magnetically under argon for about one hour during which time white, solid, triphenylmethylphosphonium iodide precipitated. With a syringe, 50 milliliters (0.0328 mole) of a solution of n-butyllithium in benzene were added and the material became very yellow in color. After 10 minutes of agitation, 1.47 milliliters (0.0134 mole) of titanium tetrachloride were added to bring the mole ratio of ylide compound to transition metal compound to 2.45. A deep brown, copious precipitate was formed immediately.

The mixture was agitated for about one minute and then pressurized to 98 pounds per square inch with propylene. This was agitated for 3 hours and a maximum temperature of 38° C. was noted about 30 minutes after the titanium tetrachloride had been injected.

The color of the precipitate became more pink-brown as the reaction proceeded. Using the isolation technique described in Example I, 3.2 grams of white, solid polypropylene was isolated. The infrared crystallinity ratio of this polymer was 0.54. The heptane solubility test showed this polymer to be 78.6% by weight heptane insoluble.

EXAMPLE III

A solution of 5.2 grams (0.020 mole) of triphenylphosphine and 150 milliliters of pentane were placed in a Parr pressure bottle and 1.2 milliliters (0.020 mole) of methyl iodide were added. The mixture was stirred magnetically for about 30 minutes, during which time fine crystals of white triphenylmethylphosphonium iodide were precipitated. The mixture was cooled in an ice bath and 50 milliliters (0.020 mole) of isoamyllithium were added by means of a syringe. A deep white turbidity formed immediately. To this material, 0.9 milliliter (0.0082 mole) of titanium tetrachloride was added to bring the ratio of ylide compound to transition metal compound to 2.45. A deep rose colored precipitate formed immediately.

The mixture was pressurized at ambient temperature to 25 pounds per square inch with butadiene and agitated for about 18 hours. Using the recovery procedure described in Example I, 1.2 grams of white-grey sticky gummy solid polybutadiene were recovered.

Since organo lithium-transition metal halide systems are known to be effective polymerization catalysts, the following experiments were conducted to ascertain the difference in the two catalyst systems. Insofar as possible, the same conditions were used.

EXAMPLE IV

Fifty milliliters (0.030 mole) of n-butyllithium was placed in a Parr pressure bottle and 1.34 milliliters (0.012 mole) of titanium tetrachloride were added by means of a syringe to bring the lithium to titanium mole ratio to 2.45. The mixture evolved a fluffy brown precipitate, which was agitated for a few minutes, then pressurized to 50 pounds per square inch with ethylene, at a temperature and for a time similar to those of Example I. Following the extraction procedure outlined in Example I, 18.8 grams of polyethylene were isolated. This polymer showed an infrared crystallinity ratio of 0.95.

EXAMPLE V

A solution of 50 milliliters (0.0328 mole) of n-butyllithium in benzene was placed in a Parr pressure bottle and 1.47 milliliters (0.013 mole) of titanium tetrachloride were added by means of a syringe to give a lithium to titanium mole ratio of 2.45. Again the fluffy brown precipitate formed. The mixture was agitated for several minutes and then pressurized to 98 pounds per square inch with propylene. These conditions were maintained for 3 hours, the starting temperature being about 20° C. Following the usual isolation procedure, 8.9 grams of polypropylene, having an infrared crystallinity ratio of 0.52, were isolated. The heptane solubility test showed this polymer to be 50.5%, by weight, heptane insoluble.

Table I, listed below, compares Examples I, II, IV, and V as to the crystallinity of the polymers prepared by the different catalyst systems.

*Table I*

| Example | I.R. Crystallinity Ratio [1] | Percent by Wt. Heptane Soluble | Percent by Wt. Heptane Insoluble | Percent by Wt. Heptane & Isopropanol Soluble [2] |
| --- | --- | --- | --- | --- |
| I | 1.04 | | | |
| II | 0.54 | 14.2 | 78.6 | 7.2 |
| IV | 0.95 | | | |
| V | 0.52 | 38.7 | 50.5 | 10.8 |

[1] Infrared—a Baird, Model 455 infrared spectrometer was used.
[2] Soluble in both.

Two methods for determining the crystallinity of the polymers have been used during these investigations. The "crystallinity ratios," given above, were obtained by means of infrared spectroscopy. The polymer was pressed into a film, by means of a Carver press, for 3 minutes at 16,000 pounds per square inch, at temperatures of 100° C. to 150° C. The ratio of the absorbance of the 11.9 micron band to the absorbance of the 10.3 micron band is taken as the crystallinity ratio. This method is described by W. Heinen in the Journal of Polymer Science, 38, 545 (1959), and R. G. Quynn et al. in the Journal of Applied Polymer Science, 166, 2 (1959).

Since it is known that the crystalline fraction of olefin polymers is relatively insoluble in hydrocarbon solvents as opposed to the amorphous fraction of the polymer, which is soluble, a standardized procedure for determining the relative heptane solubility, and thus the relative crystallinity, of olefin polymers was established as follows. Approximately 1 gram of finely divided polymer was refluxed with 100 milliliters of n-heptane under an inert atmosphere for two hours. The mixture was cooled and centrifuged. The residue, which represents the crystalline fraction, was dried and weighed. The supernatant liquid was poured into isopropyl alcohol in order to precipitate the heptane soluble or amorphous fraction. The amorphous polymer was heated (less than 55° C.) to remove the solvent, dried and weighed. The weight of the remaining low molecular weight polymer, which is both heptane soluble and isopropanol soluble, was determined by evaporation of the combined heptane and isopropanol filtrates on a steam bath. Weighing of this viscous liquid gave the weight of low molecular weight material.

Although the two methods of determining the relative crystallanity are not linearly related, a definite and consistent relationship has been shown between both methods. This relationship has also been found by R. G. Quynn et al., Op. Cit.

The ylide compound as prepared includes, in the solvent, an equimolecular quantity of lithium halide. The removal of the lithium compound, prior to the interaction of the ylide compound with the transition metal compound, is optional. The usefulness of the catalyst is not believed to depend upon the absence or presence of the lithium compound.

It has been found that the catalyst system of this invention is compatible with the organic-metallic compounds normally used to make up Ziegler catalysts. These compounds include any compound capable of giving rise to carbanions or hydride ions. The catalyst is formed by interacting the ylide compound, in either the impure or the purified state, with the transition metal compound. The exact mechanism of the interaction is not known, but such interaction results in a change in color, and for some reactants, a precipitate is formed.

The molecular ratio of the ylide compound to the transition metal compound has been found to be critical within certain limits. Although a ratio of from somewhat less than 1 to a ratio of about 2.5 is preferred, a ratio of less than 0.3 to a ratio of 200 or higher is operable to some extent, with resulting decreases in polymer yields. When a catalyst is employed at the higher ratios, very low concentrations of the transition metal compound should be used.

Suitable solvents in which the catalyst may be prepared and used include for example the paraffinic, the cycloparaffinic, and the aromatic hydrocarbons which are inert, and liquid under the process conditions. The lower molecular weight alkanes such as pentane and hexane are especially useful when the polymerization is conducted at realtively low temperatures. The higher molecular weight paraffins, the cycloparaffins and aromatics such as heptane, cyclohexane and benzene are preferred for use at relatively higher temperatures. Mixtures of any two or more solvents may be used in the process of this invention.

Although ambient temperatures of from 20 to 50° C.

were used for preparing the catalyst in the examples described above, the temperatures employed may be varied somewhat without detrimental effects. The preferred temperature range for the preparation of the catalyst is from about 0° to 90° C. A range from about —20° to 200° C. is useful.

The polymerization temperatures may be varied within the range of —30° C. to 210° C. according to the type desired to be produced. Ambient temperatures yield a polymer which is moderately crystalline. Lower temperatures (about 0° C.) produce higher molecular weight, crystalline polymers. While higher temperatures (about 80–100° C.) will produce lower molecular weight, slightly more crystalline polymers. At temperatures of from about 130° C. to about 150° C., the catalyst system of this invention will produce a relatively crystalline polymer which is soluble at those temperatures. It is known that even highly crystalline polymers are soluble in certain hot solvents. It will be apparent to those skilled in the art, that varying the polymerization conditions will vary the molecular weight and crystallinity or amorphourness of the of the polymer product, and that careful control of these conditions will produce the desired product.

The polymer recovery procedures used in the examples are laboratory expedients and would not necessarily be commercially feasible. The exact procedure used must be determined by the solvent and catalyst used, the polymer produced and the economics of the operation.

While in the laboratory-scale polymerizations, the preferred catalyst deactivator or reaction terminating material is methanol, such related alcohols as ethanol and isopropanol, as well as water, water-alcohol mixtures, and even air may be used to stop the reaction. In cases where solvent recovery is desirable, the use of the alcohols, which form azeotropes with the hydrocarbon reaction solvent, require costly azeotropic distillations, which may be undesirable. However, if water, for example, in the form of steam is used as a catalyst deactivator, a relatively simple phase recovery system will free the solvent for reuse.

The procedure for washing the separated polymer also may be varied. For washing the polymers produced by this invention which are largely crystalline, a wide variety of washing materials may be employed. While methanol is preferred, any organic or inorganic material which acts to remove residual catalyst from the ploymer may be used. It may be desirable to grind or otherwise comminute the polymer prior to washing in order to facilitate the washing step.

It is understood that this invention is not limited to polymerizing the lower molecular weight alpha olefins which are illustrated in the examples, but is applicable in general to any unsaturated materials which may be polymerized by a similar mechanism or reaction. The preferred class of polymerizable materials are the monoolefins and polyolefins having up to and including 10 carbon atoms per molecule. Examples of the monoolefins which may be polymerized with the catalyst are ethylene, propylene, 1-butene, 1-hexene, and 1-octene, as well as the 1,1-dialkyl-substituted and 1,2 dialkyl-substituted ethylenes, such as 2 methylbutene-1, 2-methyl-hexene-1, 2-ethyl-heptene-1, and the like. Vinyl benzenes such as styrene, vinyl toluene, and divinyl benzene are useful as monomers. The cyclic olefins such as cyclohexene and cycloheptene also may be polymerized. Examples of suitable open chain conjugated polyolefins other than 1,3-butadiene are isoprene, 2,3 dimethyl-1,3-butadiene, 2-methyl-1,3-pentadiene, chloroprene, 1-cyanobutadiene, 2-methyl-3 ethyl-1,3-pentadiene, 2,3 dimethyl-1,3 pentadiene, 2-methoxybutadiene, 2 phenylbutadiene and the like. Examples of non-conjugated diolefins and polyolefins which are suitable for use with this invention are 1,5 hexadiene, 1,4 pentadiene and 1,4,7-octatriene. Examples of other compounds which may be polymerized are acrylonitrile, methacrylonitrile, acrylic acid, methacrylic acid, cinnamic acid, ethyl acrylate, methyl methacrylate, vinyl acetate, vinyl chloride, 2-vinylpyridine, 4-vinyl-pyridine, 2-methyl-5-vinylpyridine, vinyl ethers and the like. In general it can be said that any material or mixture of materials which contain at least one active $>C=C<$ group per molecule may be polymerized by this invention. "Polymerization" as used herein means the combining of two or more such molecules to form a larger molecule.

The catalyst may be used in any known manner. Although all of the examples herein employ the catalyst in the solvent in which the catalyst was produced, the catalyst may be first purified, dried, and used in that state. For instance, the ylide may be interacted with a solid transition metal compound, placed on a suitable support, and used in a fixed bed reactor for a continuous polymerization process. This catalyst may also be employed in the solid state in a fluidized bed process, using the olefin monomer as the supporting fluid.

I claim:

1. A process for producing a catalyst which comprises interacting (1) a transition metal compound selected from the group consisting of the halides, subhalides, oxyhalides, complex halides, cyclopentadienyl chelates, chelates of beta ketones, oxides, salts of organic acids, and esters of scandium, titanium, vanadium, chromium, manganese, iron cobalt, nickel, yttrium, zirconium, niobium, molybdenum, technetium, uranium, thorium, selenium, ruthenium, rhodium, palladium, tellurium, lanthanum, lutetium, hafnium, tantalum, wolfram, rhenium, osmium, iridium, platinum and actinium with (2) an ylide compound of the formula

in which $R^1$, $R^2$, and $R^3$ are the same or different radicals selected from the group consisting of normal alkyl, branched chain alkyl, halogenated alkyl, hydroxyalkyl, alkoxyalkyl, aroxyalkyl, aralkyl, aryl, alkaryl, halogenated aryl, hydroxyaryl, aroxyaryl, alkoxyaryl, cycloalkyl, and cycloalkyl radicals substituted with radicals selected from the group consisting of halogen, hydroxy, alkoxy, aryloxy, aryl, and alkyl; and $R^4$ is a radical selected from the group consisting of alkylidene, alkenylidene, cycloalkylidene, cycloalkenylidene, and the substitution products thereof selected from the group consisting of aryl, halogen, aryloxy and alkoxy substituents.

2. The process of claim 1, wherein the transition metal compound is added to the ylide compound.

3. The process of claim 1, wherein the ylide compound is added to the transition metal compound.

4. The process of claim 1, wherein the molar ratio of the ylide compound to the transition metal compound is from a ratio of about 1.0 to a ratio of about 2.5.

5. The process of claim 1, wherein the molar ratio of the ylide compound to the transition metal compound is from a ratio of about 0.3 to a ratio of about 200.

6. A process of preparing a new composition of matter comprising the step of interacting an ylide and a periodic group IV—VIII transition metal compound, said metal in said compound being reducible to a lower positive valence state.

7. A new catalyst comprising the interaction product of an ylide and a periodic group IV—VIII transition metal compound, said metal in said compound being reducible to a lower positive valence state.

8. The catalyst of claim 7 in which the transition metal compound comprises at least one halogen atom.

9. The catalyst of claim 7 in which the transition metal compound is a chelate of beta ketone.

10. A catalyst which comprises the interaction product of (1) an ylide compound of the formula

in which R¹, R², and R³ are the same or different radicals selected from the group consisting of normal alkyl, branched chain alkyl, halogenated alkyl, hydroxyalkyl, alkoxyalkyl, aroxyalkyl, aralkyl, aryl, alkaryl, halogenated aryl, hydroxyaryl, aroxyaryl, alkoxyaryl, cycloalkyl, and cycloalkyl radicals substituted with radicals selected from the group consisting of halogen, hydroxy, alkoxy, arloxy, aryl, and alkyl; and R⁴ is a radical selected from the group consisting of alkylidene, alkenylidene, cycloalkylidene, cycloalkenylidene, and the substitution products thereof selected from the group consisting of aryl, halogen, aryloxy and alkoxy substituents, and (2) a transition metal compound selected from the group consisting of the halides, subhalides, oxyhalides, complex halides, esters, cyclopentadienyl chelates, chelates of beta ketones, salts of organic acids, and oxides of scandium, titanium, vanadium, chromium, manganese, iron, cobalt, nickel, yttrium, zirconium, niobium, molybdenum, technetium, uranium, thorium, selenium, ruthenium, rhodium, palladium, tellurium, lanthanum, lutetium, hafnium, tantalum, wolfram, rhenium, osmium, iridium, platinum and actinium.

11. A catalyst of claim 10, wherein the molar ratio of ylide compound to transition metal compound is from about 1.0 to about 2.5.

12. A catalyst of claim 10, wherein the molar ratio of ylide compound to transition metal compound is from about 0.3 to about 200.

13. The catalyst of claim 10, in which the transition metal compound is titanium tetrachloride.

14. The catlayst of claim 10, in which the transition metal compound is TiCl₃.

15. The catalyst of claim 10, in which the transition metal compound is TiCl₂.

16. The catalyst of claim 10, in which the transition metal compound is VCl₄.

17. The catalyst of claim 10, in which the transition metal compound is VCl₃.

18. The catalyst of claim 10, in which the transition metal compound is VOCl₃.

19. The catalyst of claim 10, in which the transition metal compound is a vanadium oxyhalide comprising fluorine.

20. The catalyst of claim 10 in which the transition metal compound is VOCl₅.

21. The catalyst of claim 10, in which the transition metal compound is vanadium acetylacetonate.

22. The catalyst of claim 10, in which the transition metal compound is Ti(OC₄H₉)₄.

23. The catalyst of claim 10, in which the transition metal compound is Ti(OC₆H₅)₄.

24. The catalyst of claim 10, in which the ylide compound is triphenyl phosphine methylene.

25. The catalyst of claim 10, in which the ylide compound is tri-n-butyl phosphine ethylidene.

26. The catalyst of claim 10, in which the ylide compound is tri-isobutyl phosphine dimethyl methylene.

27. The catalyst of claim 10, in which the ylide compound is triphenyl phosphine methoxymethylene.

28. The catalyst of claim 10, in which the ylide compound is trixylyl phosphine cyclohexylidene.

29. A process for producing polymers which comprises subjecting a monomer containing an active vinyl group to the influence of a catalyst which is the product of the interaction of (1) a transition metal compound selected from the group consisting of the halides, subhalides, oxyhalides, complex halides, esters, cyclopentadienyl chelates of beta ketones, salts of organic acids, and oxides of scandium, titanium, vanadium, chromium, manganese, cobalt, nickel, ytrium, zirconium, niobium, molybdenum, uranium, thorium, selenium, technetium, ruthenium, tellurium, rhodium, palladium, lanthanum, lutetium, hafnium, tantalum, wolfram, rhenium, osmium, iridium, platinum and actinum and (2) an ylide of the formula

in which R¹, R², and R³ are the same or different radicals selected from the group consisting of normal alkyl, branched chain alkyl, halogenated alkyl, alkoxyalkyl, aroxyalkyl, aralkyl, aryl, alkaryl, halogenated aryl, aroxyaryl, alkoxyaryl, cycloalkyl, and cycloalkyl radicals substituted with radicals selected from the group consisting of halogen, alkoxy, aryloxy, aryl, and alkyl; and R⁴ is a radical selected from the group consisting of alkylidene, alkenylidene, cycloalkylidene, cycloalkenylidene, and the substitution products thereof selected from the group consisting of aryl, halogen, aryloxy and alkoxy substituents.

30. The process for polymerizing of claim 29, wherein the active vinyl containing monomer is an olefin.

31. The process for polymerizing of claim 29, wherein the active vinyl containing monomer is an ethylene.

32. The process for polymerizing of claim 29, wherein the active vinyl containing monomer is a propylene.

33. The process for polymerizing of claim 29, wherein the active vinyl containing monomer is a butadiene.

34. A process of preparing a new composition of matter comprising the step of interacting (1) a diylide compound of the formula

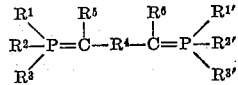

in which R¹, R², R³, R¹′, R²′ and R³′ are the same or different radicals selected from the group consisting of normal alkyl, branched chain alkyl, halogenated alkyl, hydroxyalkyl, alkoxyalkyl, aroxyalkyl, aralkyl, aryl, alkaryl, halogenated aryl, hydroxyaryl, aroxyaryl, alkoxyaryl, cycloalkyl, and cycloalkyl radicals substituted with radicals selected from the group consisting of halogen, hydroxy, alkoxy, aryloxy, aryl, and alkyl; R⁴ is a radical selected from the group consisting of alkylene, alkenylene, cycloalkylene, cycloalkenylene, and the substitution products thereof selected from the group consisting of aryl, halogen, and alkoxy substituents; and R⁵ and R⁶ are the same or different radicals selected from the group consisting of halogen, aryloxy, alkoxy, hydrogen, and alkyl, alkenyl, aryl, cycloalkyl, cycloalkylene, and the substitution products thereof selected from the group consisting of aryl, halogen, alkoxy, and aryloxy; and (2) a transition metal compound selected from the group consisting of the halides, subhalides, oxyhalides, complex halides, cyclopentadienyl chelates, chelates of beta ketones, salts of organic acids, esters, and oxides of scandium, titanium, vanadium, chromium, manganese, cobalt, nickel, yttrium, zirconium, niobium, molybdenum, uranium, thorium, selenium, technetium, ruthenium, tellurium, rhodium, palladium, lanthanum, lutetium, hafnium, tantalum, wolfram, rhenium, osmium, iridium, platinum and actinium.

References Cited in the file of this patent

UNITED STATES PATENTS

| | | |
|---|---|---|
| 2,832,759 | Nowlin et al. | Apr. 29, 1958 |
| 2,910,461 | Nowlin et al. | Oct. 27, 1959 |
| 2,956,991 | Coover et al. | Oct. 18, 1960 |